May 21, 1935.  E. E. WEMP  2,001,804
OVERRUNNING DRIVE CONSTRUCTION
Filed July 8, 1931  2 Sheets-Sheet 1
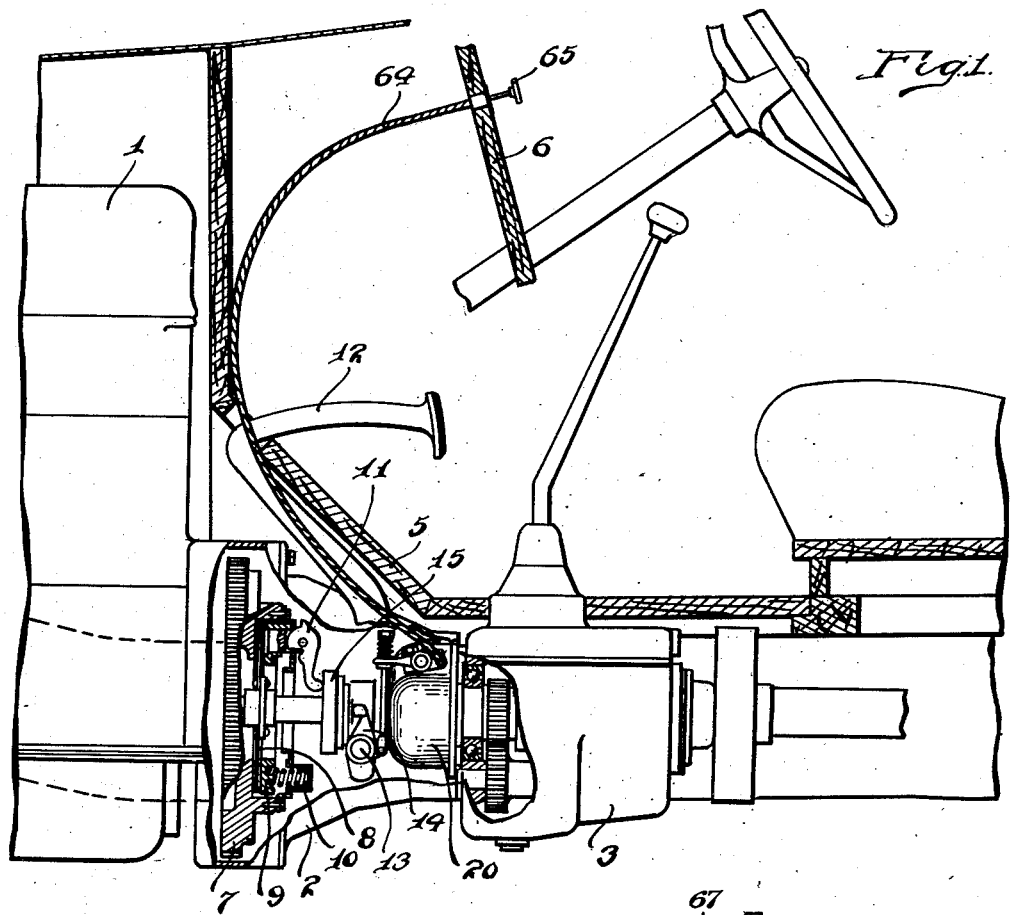
Fig.1.
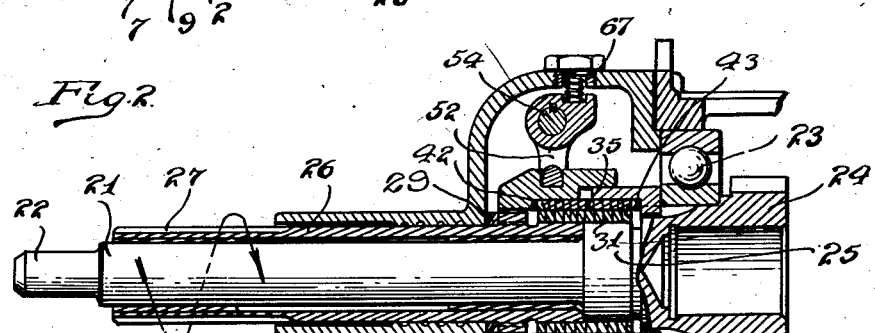
Fig.2.
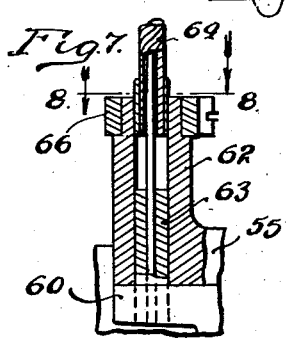
Fig.7.
Fig.8.
INVENTOR.
ERNEST E. WEMP.
BY Barnes and Kisselle
ATTORNEYS.

May 21, 1935. E. E. WEMP 2,001,804
OVERRUNNING DRIVE CONSTRUCTION
Filed July 8, 1931 2 Sheets-Sheet 2
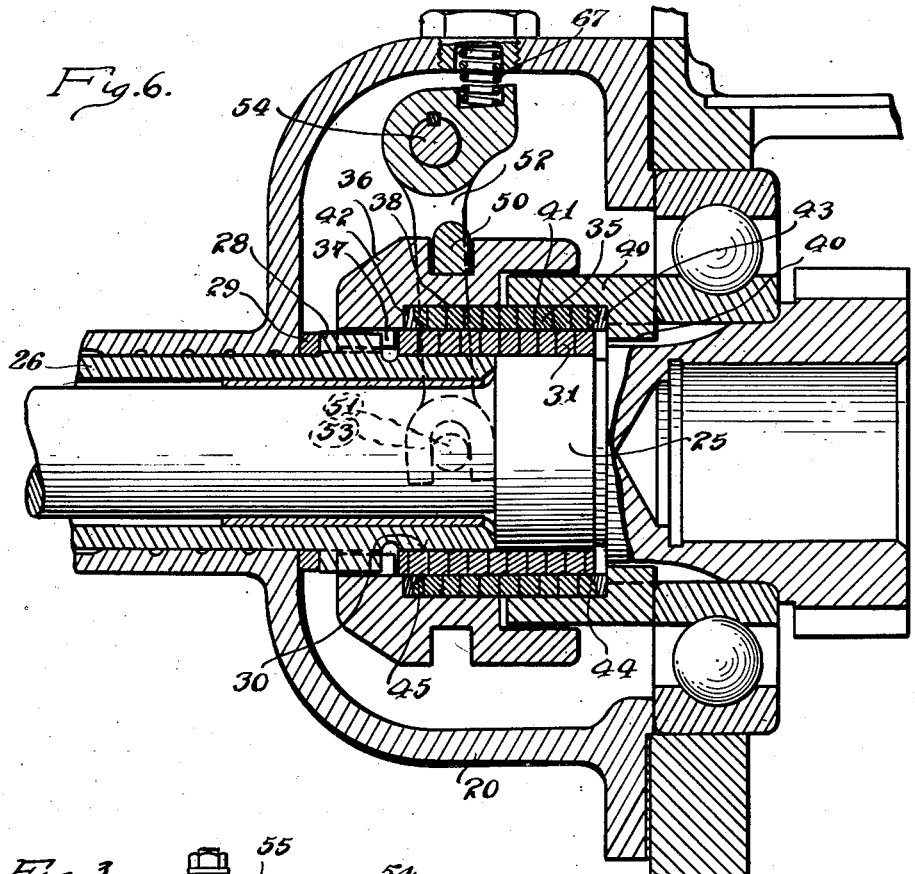
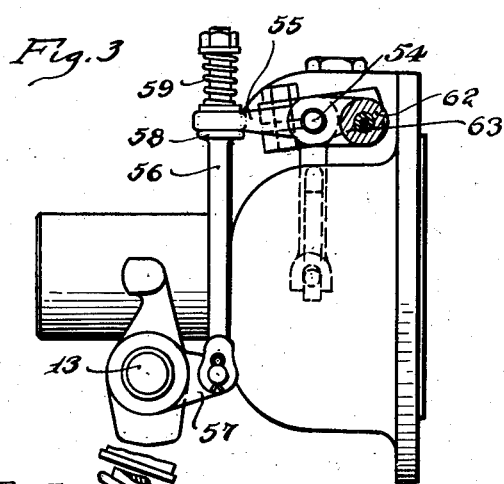
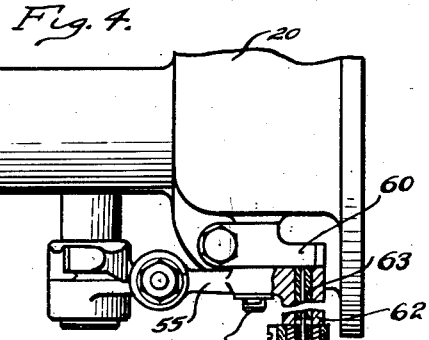
INVENTOR.
ERNEST E. WEMP.
BY Barnes and Kisselle
ATTORNEYS.

Patented May 21, 1935

2,001,804

UNITED STATES PATENT OFFICE 2,001,804

OVERRUNNING DRIVE CONSTRUCTION

Ernest E. Wemp, Detroit, Mich.

Application July 8, 1931, Serial No. 549,545

17 Claims. (Cl. 192—48)

This invention relates to mechanism for permitting a driven member to overrun a driving member, and which is arranged so that it may be controlled to render the overrunning action ineffective, thus establishing a positive connection between the driving and driven member so that the driven member may not overrun the driving member.

An advantageous environment for a construction made in accordance with this invention is an automotive vehicle in which the construction permits the vehicle to overrun the engine. In other words, an operator of the vehicle may control the engine in such a manner that it reduces to idling speed while the vehicle coasts along and does not decelerate with the engine. This action is commonly termed free wheeling.

A principal object of the invention is the provision of an overrunning clutch arrangement which materially facilitates the control thereof by the operator as the operator elects to either employ the overrunning action or lock out the overrunning action so that it is ineffective. The manner in which this is accomplished will be better understood after the following detailed description is considered in connection with the accompanying drawings. Another object of the invention is the provision of an overrunning clutch structure in which the overrunning effect may be locked out or rendered ineffective without the necessity of employing a dental engagement such as is the case where dogs or teeth are caused to interlock each other to form a positive connection between driving and driven parts. Heretofore, dental engagements have been provided for this purpose; it will be appreciated that difficulties arise in effecting dental engagement between two relatively rotatable members especially in the hands of an unskilled operator, or an operator not familiar with mechanical features. These difficulties are overcome in a large measure when the necessity of a dental engagement is eliminated.

In the accompanying drawings:

Fig. 1 is a view illustrating various parts of an automotive vehicle showing some parts in section and with some parts cut away.

Fig. 2 is a sectional view taken through the overrunning clutch unit.

Fig. 3 is a side elevational view showing the housing of the overrunning clutch unit.

Fig. 4 is a view partly in plan and partly in section.

Fig. 5 is an enlarged detail illustrating the position some of the parts may take.

Fig. 6 is an enlarged sectional view showing the overrunning clutch in locked out or positive drive condition.

Fig. 7 is a sectional view showing the movable device under control of the operator by means of which the overrunning clutch is controlled for overrunning action or positive drive action.

Fig. 8 is a view looking substantially on line 8—8 of Fig. 7.

Referring now to Fig. 1, there are a number of conventional automotive vehicle parts shown such as engine 1, clutch housing 2, transmission 3, floor boards 5, and instrument panel or board 6. The flywheel of the engine is illustrated at 7, and the usual clutch comprises a driven disk 8 packed between the flywheel and pressure ring 9 by springs 10. To release the clutch there may be a number of levers, as shown at 11, rocked clockwise, to release the clutch by retracting the pressure ring 9 against the springs 10. This may be accomplished through the means of a clutch lever 12 which when depressed rocks the shaft 13, which in turn rocks an arm 14 for urging the clutch release member 15 from right to left. The clutch and associated parts as thus far described, may be of any conventional design.

The overrunning clutch may be disposed in a housing 20. A shaft 21 is arranged so that its end 22 may be journaled in the flywheel of the engine on the axial center thereof, and this shaft extends into the transmission housing 3, journaled as by means of an anti-friction bearing 23, and having on its end inside the housing a member in the nature of a gear 24 which communicates a driving power to the gears in the transmission, thence to the rear wheels of the vehicle in the usual manner. This member may have an external surface portion 25.

Positioned over the shaft 21 and journaled thereon is a sleeve 26, and the driven disk 8 may have a hub mounted on the sleeve as by means of splines 27 in the customary manner. This sleeve 26 extends into the housing 20 and is provided with teeth 28 preferably spaced from the housing 20 by a spacer ring 29 (see Fig. 6). The teeth 28 are external teeth. Also the sleeve member 26 may have an external face 30 next adjacent the portion 25 of the shaft 21, and the parts 30 and 25 may be of the same diameter. A coil spring 31 is positioned over the parts 25 and 30 as shown, and this coil spring serves as a clutch element for establishing a drive between the sleeve 26 and shaft 21. Assume that the engine is driving sleeve 26 in the direction of the arrow shown in Fig. 2; in the absence of a connection between sleeve 26 and shaft 21 no drive would be communicated to the gear member 24 on the shaft. However, coil spring 31 establishes a driving connection. With the direction of rotation being that as indicated by the arrow in Fig. 2, the windings of the coil spring 31 are to be left hand windings. Accordingly, as the sleeve 26 rotates, the tendency is for the surface 30 to twist the spring in such manner that there is a winding up tendency to the end that the spring 31 winds up slightly and contracts to frictionally engage the surface 30 and the surface 25. The end convolutions of the spring 31 may be arranged to relatively snugly grip the surfaces 30 and 25, respectively, so that as the sleeve 26 tends to rotate the forward end of the spring moves slightly in a winding up action to grip surface 30 and this action is resisted by the frictional engagement of the spring with member 25 to the end that the spring is tightly contracted around parts 30 and 25 to establish a driving connection. However, when the vehicle tends to overrun the engine, and accordingly tends to overrun the sleeve 26, the member 25 rotates faster than the part 30; this action tends to expand or unwind the spring 31. This accordingly permits the spring 31 to release its tight engagement around surfaces 25 and 30, and permits member 25, as well as the vehicle, to overrun the sleeve 26 and the engine. An operator may therefore, while driving the vehicle along the highway, decelerate the engine, yet the vehicle is permitted to glide along or coast. As the engine is again accelerated the rotation of sleeve 26 tends to exceed 25 resulting in contracting the spring 31 and the drive connection is re-established.

There are times, however, when it is desired to lock out this overrunning action so that the engine and vehicle are positively connected; an example of such a time is when it is desired that the compression of an engine serve as a decelerating agency for the vehicle. For this purpose a coil spring 35 is provided which may be located immediately over coil spring 31, and which in an installation which rotates as above described, may be a spring of left hand winding. A member 36 having teeth 37 meshing with teeth 28 is located over the sleeve 26 and it has an internal circumferential face 38. Another member 40 with an internal circumferential face 41 is secured to the shaft 21 as by means of interengaging teeth 40. The coil spring 35 is located inside the recess formed by the surfaces 38 and 41 of these two members. At the ends of the spring there may be energizing rings 42 and 43 having angularly disposed faces, as shown, cooperating with which may be angularly disposed surfaces 44 and 45 provided on the internal edges of the end convolutions of the spring. The member 36 is axially shiftable to, in one position, permit coil spring 35 to be ineffective, and in another position to cause the coil spring to be effective to establish a drive connection when shaft 21 tends to overrun sleeve 26. In the position shown in Fig. 2, spring 35 is ineffective and permits relative rotation between shaft 21 and sleeve 26. In the position shown in Fig. 6 the member 36 has been shifted to cause the energizing rings 42 and 43 to frictionally engage the ends of spring 35. Under this condition, when the shaft 21 tends to overrun sleeve 26, which as above pointed out, is permitted by expansion of spring 31, the spring 35 expands due to the twisting tendency effecting an unwinding action of spring 35. In other words, as member 40, which rotates from shaft 21, tends to overrun member 36 which rotates with sleeve 26, the spring 35 is frictionally engaged by these two members, unwound somewhat and its convolutions engage the inside surfaces 38 and 41 and establish a driving connection.

Accordingly, it will be noted that this construction incorporates in reality two one-way drive connections in which the coil spring establishes a one-way drive connection from the engine to vehicle propelling parts, and in which another coil spring establishes a one-way drive connection from the propelling parts to the engine, with the latter drive connection under control of the operator so that it may be rendered effective or ineffective as desired. When both springs are effective a positive drive is established irrespective of the direction of applied torque. Coil springs of this nature are capable of establishing an efficient non-slipping drive connection as the gripping efficiency substantially squares itself with each additional convolution, and the materials may be selected for giving the desired coefficient of friction and the diameter of the springs and the surfaces with which they engage may be selected for obtaining the desired gripping effect, as the gripping effect increases with diameter increase.

The control mechanism and the manner of its operation for rendering the spring 35 effective or ineffective is an important feature. The member 36 may be grooved for the reception of a collar 50 provided with a stud 51 on each side of the member 36, and a U shaped member 52 having forked ends 53 may straddle the member 36 with its forked ends fitting over the studs 51. This member 52 may be keyed to a control shaft 54. A coil spring 67 may be employed for acting upon the member 52 to rock it clockwise as Fig. 6 is viewed so as to normally hold the member 36 in the position shown in Fig. 2 with the spring 35 ineffective. In other words, in this position the overrunning or free wheeling action is permitted.

The shaft 54 projects out of the housing 20 and journaled thereon is a rocker arm 55. This rocker arm is connected to the clutch rock shaft 13 as by means of a rod 56 journaled to an arm 57 and extending through the apertured end of rocker arm 55, see Fig. 3. The rod 56 may have a fixed shoulder 58 abutting one side of the rocker arm 55, while on the other side there is preferably interposed the spring 59, for purposes which will presently appear. Mounted upon the shaft 54 advantageously between the housing 20 and rocker arm 55 is an arm 60. This arm is designed to rock shaft 54 and may be clamped around the same as shown in Fig. 5, or be otherwise fixed or keyed to the shaft 54. This arm 60 may have a curved surface 61. As most clearly shown in Fig. 7 the rocker arm 55 may have an extension 62 of cylinder construction in which is mounted a plunger 63. A Bowden wire 64 is connected to the plunger 63 and extends to the instrument panel 6 where it is provided with a control piece such as a button 65. The operator by pushing and retracting the button 65, may reciprocate plunger 63, when, however, the parts are in condition to permit of this. The end of the extension 62 may be of reduced diameter and split as shown so that it may be clamped around the end of the Bowden wire as by means of a clamp 66.

Let it be assumed that the vehicle is being operated with the friction driving clutch engaged and the overrunning action effective. The member 36 accordingly will be in the position shown in Fig. 2. The plunger 63 may be substantially in the position illustrated in Fig. 4 so that its end may be in a position to wipe the face of the arm 60. Button 65 will be retracted for the purpose of positioning the plunger as shown. Under these conditions an attempt to push the button 65 will not be successful for positioning the plunger 63 in its cylinder as it abuts or will abut the arm 60. In the operation of the friction clutch by a depression of the pedal 12, resulting in rocking of shaft 13, the arm 55 will be rocked, which it is free to do upon shaft 54. In order to render the overrunning action ineffective it is incumbent upon the operator to first release the friction clutch by depressing the pedal 12. This, through the link 56, rocks the arm 55 clockwise to a position such as is illustrated in Fig. 5. In this position plunger 63 is clear of the arm 60 and the button 65 may now be pushed to eject the plunger 63 partially out of its socket and push it underneath arm 60, as shown in Fig. 7. Now when the friction clutch is re-engaged, the clutch packing springs serve to rock shaft 13 which, through link 56, rocks the arm 55 counter-clockwise from a position substantially shown in Fig. 5 to a position substantially shown in Fig. 3, and due to the fact that the plunger is under the arm 60, the arm 60 is rocked counter-clockwise thus rocking member 52 and shifting member 36 to the position shown in Fig. 6.

Heretofore in overrunning clutch constructions of an automotive vehicle it has been necessary to substantially synchronize the rotating parts to permit of a dental engagement. These parts are synchronized when the engine is pulling the vehicle. Under the circumstances where the vehicle is driven to the top of a hill and the operator upon going over the crest sees a steep incline before him, and desires the overrun locked out to permit the engine to serve as a braking agency for the vehicle, it is necessary for him to accelerate the engine to cause it to pull the car forward, and then, and only then is it feasible to establish the dental engagement to lock out the free wheeling. Another way is to bring the vehicle to a stop and then establish the dental connection. It will be seen that it is objectionable to have to accelerate the engine to vehicle driving speed having already started down an incline where a decelerating effect is desired.

In accordance with the present invention it is but necessary for the operator to declutch, press the button 65 and then re-engage the clutch and the free wheeling or overrunning action is locked out as the spring 35 has been energized. Furthermore, it is to be pointed out that this action may be done very quickly, as no time need lapse for permitting the parts to synchronize in rotation. Upon re-engagement of the friction clutch after the button 65 has been depressed, the spring 35 immediately exerts frictional tendency upon members 36 and 40 serving to synchronize them, and then with a more or less continuous action, sufficiently expands to tie them together for uniform rotation so long as the vehicle tends to overrun the engine. The movement required to engage the friction clutch may be greater than the movement required to shift member 36 to its lock-out position. As the link 56 pulls downwardly and the member 36 reaches the end of its movement for locking out the overrun, the spring 59 may compress to permit greater movement of the link 56.

It will be noted that the overrunning clutch arrangement is positioned ahead of the transmission; this is advantageous as the vehicle may be reversed while the parts remain in overrunning position as the direction of rotation of the parts is always the same ahead of the transmission, the reversal taking place only in the transmission and the rear drive shaft. Accordingly, although the parts may be set to obtain the overrunning action, the operator may reverse the vehicle without locking out the overrunning clutch. Moreover, by placing the overrunning clutch ahead of the transmission, the effective torque upon the same is not as great as it would be if it were placed to the rear of the transmission when the engine is propelling the car through reduction gears in the transmission.

It will be noted that the operator does not directly effect locking out of the overrunning action, as this is done more or less in an automatic manner by the engagement of the friction clutch. As above pointed out, the operator merely positions the plunger 63 when the clutch is disengaged, and then it is the action of the clutch packing springs which lock out the overrunning action when the clutch engages. When the clutch is disengaged by depression of the lever 12 the lock-out is released, and then the operator may, at his desire, actuate button 65 so that upon re-engagement of the friction clutch the lock out is not rendered effective.

What is claimed is,

1. In an overrunning drive, the combination of driving and driven members, a coil spring for frictionally establishing a one-way drive between the members, and another coil spring for establishing a one-way drive between the members reverse to the drive afforded by the first mentioned spring, and control means for rendering the second named spring only effective and ineffective at will.

2. The combination of a driving member and a driven member, a coil spring arranged to frictionally engage the members to establish driving connection from driving member to driven member, permitting the driven member to overrun the driving member, another coil spring associated with the driving and driven members, and means controllable at will for rendering the second named coil spring ineffective and effective for establishing a one-way drive connection from driven member to driving member.

3. In an overrunning clutch construction, the combination of a driving member and a driven member, means comprising a coil spring establishing a one-way drive connection between said members, means comprising another coil spring for establishing a one-way drive connection between said members reverse to the driving connection established by the first mentioned spring, and means for rendering the second named spring only effective or ineffective at will.

4. The combination of a driving member and a driven member, a pair of coil springs associated with these members, one establishing a one-way drive from driving member to driven member, and the other establishing a one-way drive from driven member to driving member, and means controllable at will for rendering the second named spring effective or ineffective for establishing a one-way drive from driven member to driving member.

5. The combination of a driving member, and a driven member, a coil spring establishing a constant one-way drive connection between said members, and another coil spring for establishing a one-way drive connection between said members at will, the second one-way drive connection being reverse to that of the first.

6. An overrunning drive construction comprising a driving member, a driven member, said members having adjacent outside circumferential surfaces, a coil spring over said surfaces adapted to contract there-against to establish a one-way drive connection, means associated with said members having adjacent inside circumferential surfaces, a coil spring associated with said inside surfaces adapted to expand and engage the same to establish a one-way drive connection between said members reverse to the first mentioned drive connection, and means controllable at will for rendering one of said springs effective or ineffective.

7. The combination of a driving member and a driven member having outside circumferential surfaces, a coil spring adapted to contract against said surfaces to establish a one-way drive connection between driving and driven members, means associated with the driving member and providing an inside circumferential recess, and means associated with the driven member and providing an inside circumferential surface, a coil spring adapted to expand and engage said inside surfaces for establishing a one-way drive connection between the members reverse to that of the first mentioned drive connection, one of said means being axially shiftable to render said second named spring effective or ineffective.

8. The combination of a driving member and a driven member having outside circumferential surfaces, a coil spring adapted to contract against said surfaces to establish a one-way drive connection between driving and driven members, means associated with the driving member and providing an inside circumferential recess, means associated with the driven member and providing an inside circumferential surface, a coil spring adapted to expand and engage said inside surfaces for establishing a one-way drive connection between the members reverse to that of the first mentioned drive connection, one of said means being axially shiftable to render said second named spring effective or ineffective, and means controllable at will for axially shifting said shiftable means.

9. In an overrunning drive the combination of a sleeve, a shaft, said sleeve and shaft having outside circumferential surfaces, a coil spring surrounding the surfaces and adapted to contract there-against for establishing a one-way drive between sleeve and shaft, a member keyed to the shaft having an inside circumferential surface, a member keyed to the sleeve and having an inside circumferential surface, said last named means being axially shiftable, a coil spring adapted to expand and engage said inside surfaces for establishing a one-way drive between said means, and control means for shifting said axially shiftable means.

10. The combination of a driving member and a driven member, each having outside and inside circumferential surfaces, a pair of coil springs one telescoped within the other, one arranged to contract around the outside surfaces and one arranged to expand across the inside circumferential surfaces to establish, respectively, one-way drive connections between the driving and driven member, and control means for rendering one spring effective or ineffective.

11. In an automotive vehicle, the combination of a clutch, a transmission, an overrunning drive connection between the clutch and transmission, means movable to release the clutch, and means actuatable only when the clutch is released for establishing an interconnection between the overrunning drive and the means for releasing the clutch, and means operated by the interconnection upon clutch engagement for rendering the overrunning drive connection ineffective.

12. In an automotive vehicle, the combination of a clutch, means operable to release the clutch, means driven by the clutch, an overrunning drive in the last mentioned means capable of providing an overrunning action when the clutch is engaged, means operable for establishing an interconnection between the overrunning drive and the clutch-releasing means whereby upon engagement of the clutch the inter-connecting means actuates to lock out the overrunning drive.

13. In an automotive vehicle, the combination of a clutch, means movable to release the clutch, a member driven by the clutch, an overrunning drive between the clutch and the driven member, means for locking out the overrunning drive, means for interconnecting the clutch-releasing means and the locking-out means, and means movable only when the clutch is released for rendering the interconnection effective.

14. In an automotive vehicle, the combination of a clutch, means driven thereby, a coil spring establishing a one-way drive connection between the clutch and said means, means movable to release the clutch, means for rendering the overrunning drive of said coil spring ineffective, and means movable only when the clutch is released for establishing an interconnection between the clutch releasing means and the means for rendering the overrunning drive ineffective, whereby upon re-engagement of the clutch the overrunning drive is automatically rendered ineffective.

15. In an automotive vehicle, the combination of a clutch, means driven by the clutch, a coil spring for establishing a one-way drive connection between the clutch and said means whereby said means may overrun the clutch, another coil spring for establishing a one-way drive connection between the clutch and said means adapted to prevent said means from overrunning the clutch, control means for rendering the second mentioned spring effective or ineffective, means movable to release the clutch, and means for establishing an interconnection between the clutch-releasing means and the control means, whereby the clutch-releasing means operates the control means.

16. In an automotive vehicle, the combination of a clutch, means movable to release the same, an overrunning drive connection, a lock-out device therefor, a normally ineffective interconnection between the clutch-releasing means and said lock-out device, and means movable only when the clutch is released for rendering the interconnecting means effective whereby upon clutch engagement the lock-out device is actuated to prevent overrunning action.

17. In an automotive vehicle, the combination of a clutch, means driven by the clutch, a coil spring establishing an overrunning drive between the clutch and said means, means movable to release the clutch, a rocker arm actuated by said last named means, another coil spring for rendering the overrunning action of the first coil spring ineffective, shiftable means for rendering the second named spring effective, a plunger, a Bowden wire connecting said plunger and an operating device, said operating device being actuatable to move the plunger only when the clutch is released to establish a connection between said rocker arm and shiftable means whereby upon clutch engagement the shiftable means is actuated to render the second named spring effective.

ERNEST E. WEMP.